(12) United States Patent
Corre et al.

(10) Patent No.: US 6,899,842 B1
(45) Date of Patent: May 31, 2005

(54) METHOD AND INSTALLATION FOR LAYING A CYLINDRICAL PIPE ON A SUPPORT

(75) Inventors: Pierre-Yves Corre, Montfort sur Meu (FR); James Leighton, L'Hermitage (FR); Jean-Louis Saltel, Le Rheu (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/936,064

(22) PCT Filed: Mar. 1, 2000

(86) PCT No.: PCT/FR00/00506

§ 371 (c)(1),
(2), (4) Date: Jan. 4, 2002

(87) PCT Pub. No.: WO00/53963

PCT Pub. Date: Sep. 14, 2000

(30) Foreign Application Priority Data

Mar. 5, 1999 (FR) .............................................. 99 02969

(51) Int. Cl.[7] .......................... B29C 63/34; B29C 70/30; B29C 73/10; B29C 73/12; F16L 1/038
(52) U.S. Cl. .......................... 264/459; 264/495; 264/31; 264/33; 264/516; 264/564; 264/568; 264/137; 405/138; 405/155; 405/156; 405/174; 405/177; 405/179; 405/184.5; 425/62; 425/102; 425/174.6; 425/503; 425/504
(58) Field of Search .................................. 264/459, 495, 264/31, 33, 516, 564, 568, 137; 405/138, 155, 156, 174, 177, 179, 184.5; 425/62, 102, 174.6, 503, 504

(56) References Cited

U.S. PATENT DOCUMENTS

| | | | | | |
|---|---|---|---|---|---|
| 830,204 | A | * | 9/1906 | Boyle | 264/516 |
| 2,718,684 | A | * | 9/1955 | Bjorksten | 264/31 |
| 3,203,188 | A | * | 8/1965 | Evans | 405/179 |
| 3,823,565 | A | * | 7/1974 | Takada | 405/156 |
| 3,876,351 | A | * | 4/1975 | Takada | 425/62 |
| 4,182,262 | A | * | 1/1980 | Everson et al. | 118/44 |
| 4,752,431 | A | * | 6/1988 | Knowles | 264/512 |
| 4,867,921 | A | * | 9/1989 | Steketee, Jr. | 264/36.17 |
| 5,010,440 | A | * | 4/1991 | Endo | 361/215 |
| 5,451,351 | A | * | 9/1995 | Blackmore | 264/449 |
| 5,671,778 | A | * | 9/1997 | Sakuragi et al. | 138/97 |
| 5,765,597 | A | * | 6/1998 | Kiest et al. | 138/98 |

FOREIGN PATENT DOCUMENTS

| EP | 856694 A1 | * | 8/1998 | F16L/1/032 |
|---|---|---|---|---|
| GB | 2213228 A | * | 8/1989 | F16L/1/02 |

* cited by examiner

Primary Examiner—Michael P. Colaianni
Assistant Examiner—Michael I. Poe
(74) Attorney, Agent, or Firm—Robin Nava; Brigitte L. Echols

(57) ABSTRACT

A process and plant for laying a pipe in a trench comprising placing a flattened tubular preform in the trench, the perform having a reinforcement surrounding an inner seal, the reinforcement being impregnated with a resin, and inflating the perform in the trench.

12 Claims, 3 Drawing Sheets

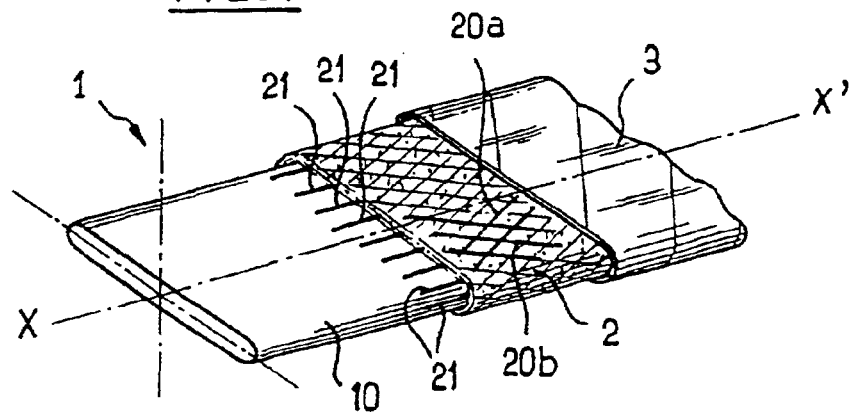
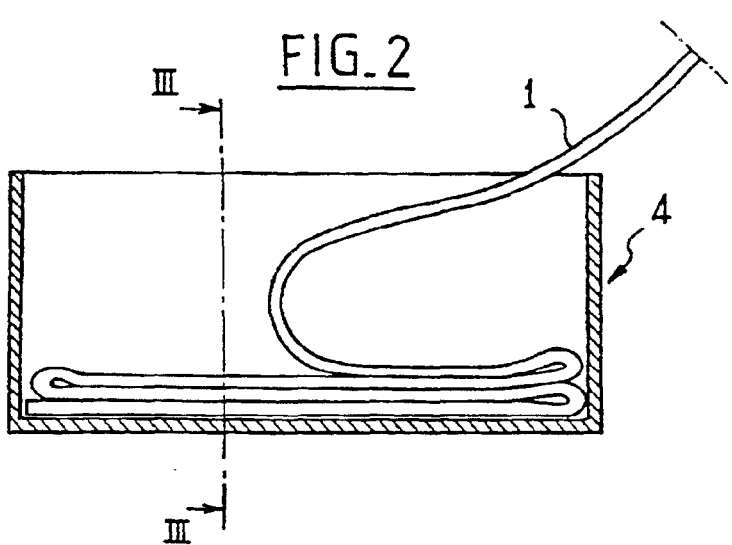
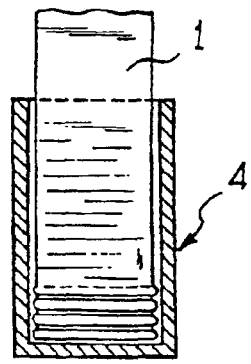
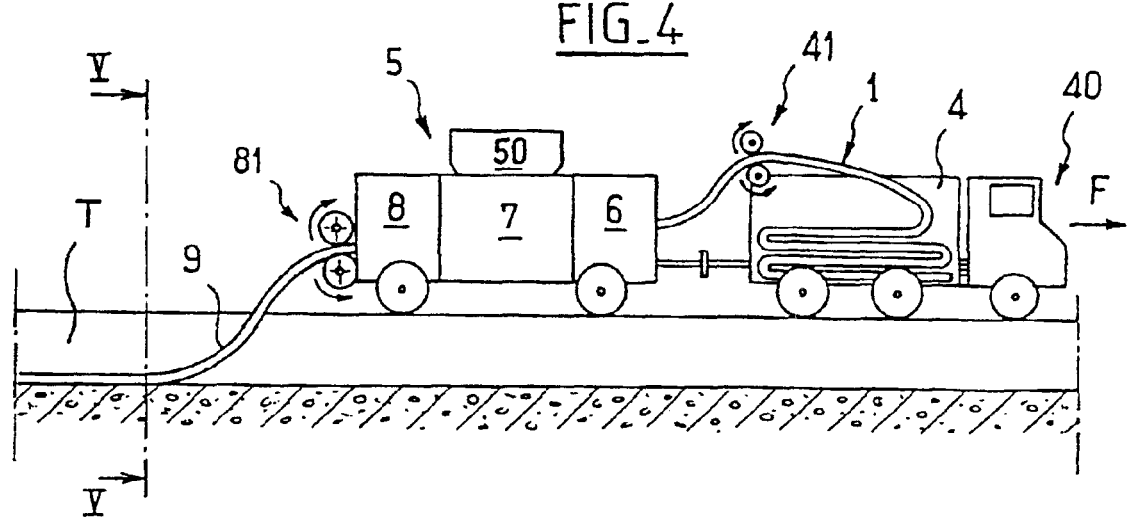

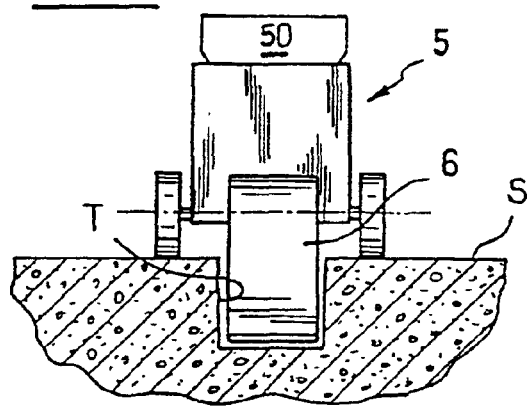
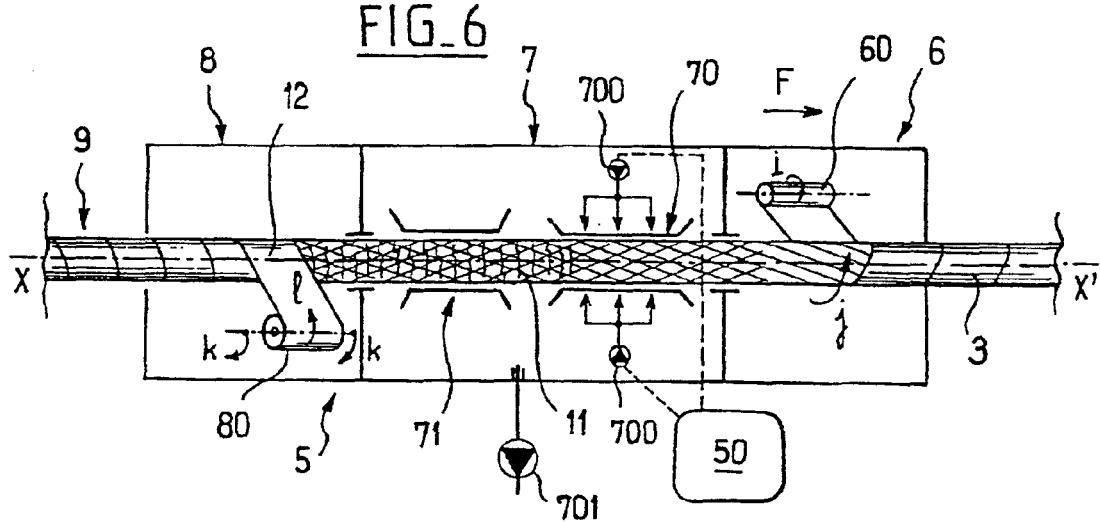
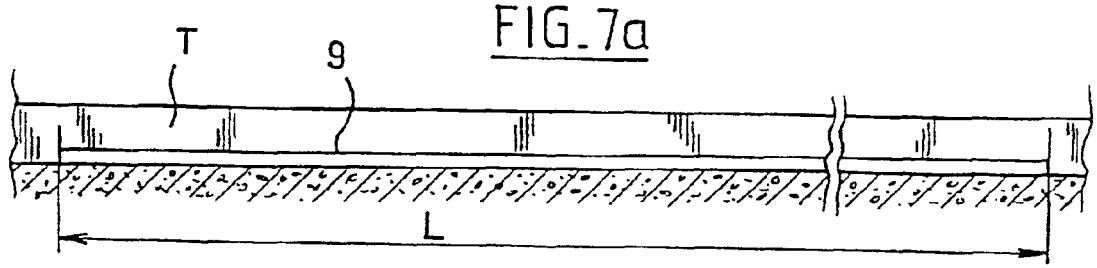
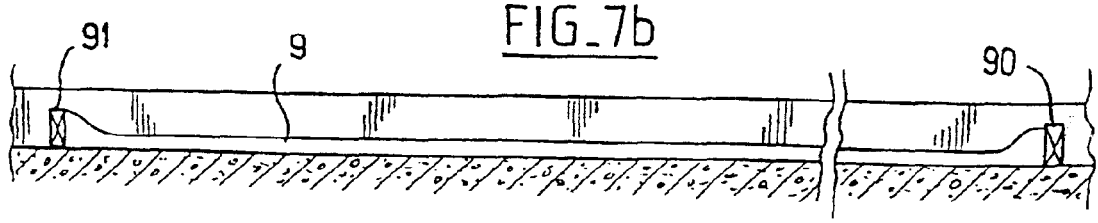

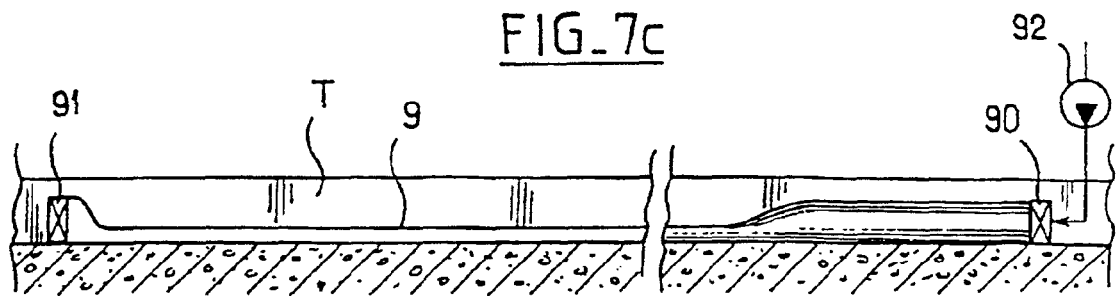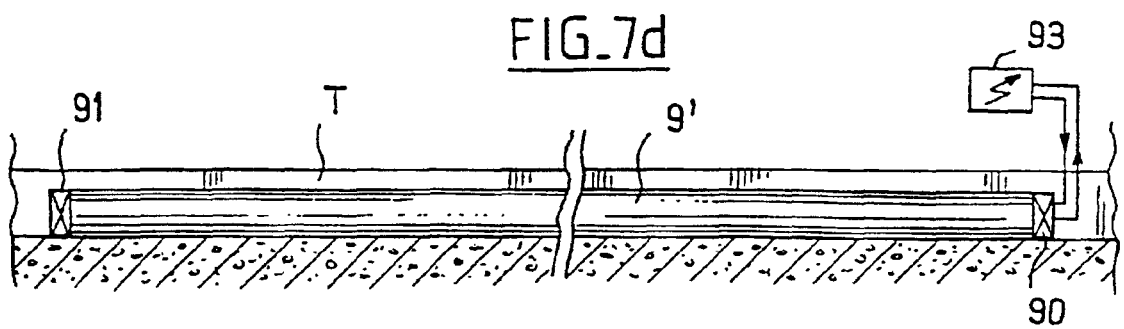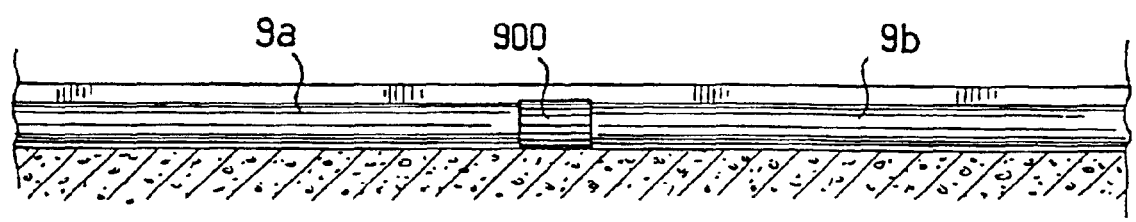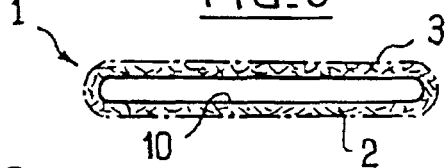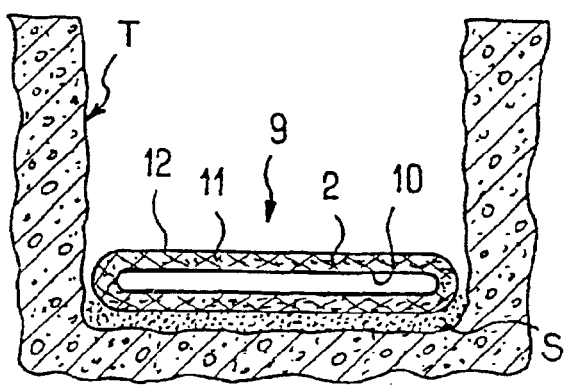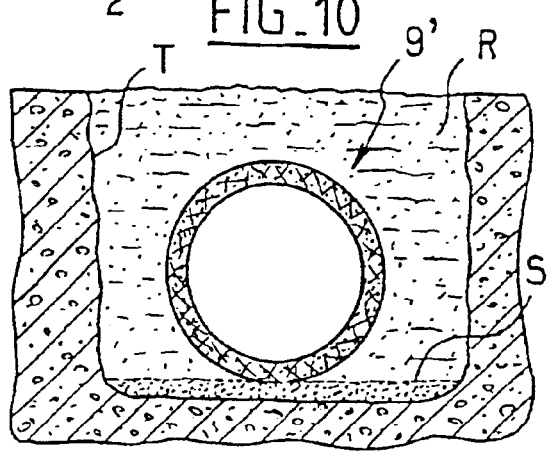

METHOD AND INSTALLATION FOR LAYING A CYLINDRICAL PIPE ON A SUPPORT

BACKGROUND OF THE INVENTION

1. Field of the Invention

The present invention relates to a process and a plant for laying a pipe in a trench.

2. Description of Related Art

Conventionally, pipes are made either of steel or of a composite composed especially of a filamentary tubular structure, for example based on glass fibers, which is impregnated with a curable resin, especially a resin which is curable under the effect of heat. The pipes are produced from elementary tube sections of predetermined length, for example 12 meters; by way of indication, their outside diameter is generally between 300 and 1 000 mm.

Steel pipes are produced by butt welding a large number of sections; they are then covered with a corrosion-protection coating. When the fluids transported are highly corrosive, an internal coating must also be provided.

Pipes made of a composite are advantageously used when the corrosion problems are very considerable, and do not allow the use of steel pipes. Such pipes are also produced conventionally starting from tubular sections of given length, for example 12 m, which are connected and fastened, end to end, generally by screwing, the final assembly being completed by adhesive bonding. Such pipes are very expensive, in particular because of the need to machine the ends in order to join the pipe sections end to end.

Of course, this conventional assembly technique poses transportation problems. In general, the pipes, are transported to the installation site by trucks, and the number of pipes transported is limited by their weight and their volume. Thus, if sections having a diameter of 500 mm are being dealt with, it is possible to transport only about ten pipes 12 m in length (i.e. in total approximately 120 m of pipe) per truck. To lay a pipe 2 000 m in length, more than 16 trucks will consequently be required, corresponding to a total transported weight of 240 tonnes. Furthermore, joining the pipes end to end is a lengthy, tedious and tricky task; for a length of 2,000 m, more than 150 joints would be required.

The relevant prior art may be illustrated by the documents FR-2 155 485 and EP-0 856 694.

The subject of FR-2 155 485 is a plant intended for laying pipes. The technique described in that document consists in using, as initial preform, a flattened and soft hose, made of a curable material, for example a synthetic polymer resin which includes a heat-activated crosslinking catalyst. The flattened hose is wound on a reel.

On the site, the reel is, unwound and the hose made round and cured, progressively as the pipe is deposited on the ground. An expanding tool, composed of two spheres, which is fitted into the pipe as it leaves the reel, has the function of making the hose "round", that is to say giving it a cylindrical shape, while a device for curing the wall is used immediately after the rounding operation; curing is obtained especially" by spraying the pipe with a liquid agent, of suitable composition and at a suitable temperature.

Document EP-0 856 694 describes a process which starts with a preform in the form of a flattened hose, the wall of which includes a fibrous reinforcement, such as a filamentary tubular structure, which is impregnated with a curable, for example thermally curable, resin. The tubular preform is stored in the flattened state, for example on a drum (or reel), and is brought onto the site in this state. The hose, which may be of great length, is laid in the trench in this flattened state and is then "made round" due to the effect of internal pressure generated by a liquid, for example water, introduced into the hose. Next the resin is cured, so as to obtain a cylindrical and rigid pipe.

The process according to document FR-A-2 155 485 raises practical difficulties insofar as it is very difficult for the double-sphere expanding tool, which is provided inside the preform and allows it to be made round, to be properly held in place.

The process according to document EP-0 856 694 requires the use of a pressurized liquid, such as water, to make the preform round once it has been deposited in the trench; the process is tricky and relatively tedious to implement; in any case, it requires the liquid in question to be available on site.

Moreover, these known techniques use a preform whose wall has already been provided with resin, the latter being incorporated into the wall in the factory during manufacture of the preform. The presence of this resin influences the weight and volume of the preform, even if it is in the flattened state. In addition, with regard to a thermosetting resin, storing it at room temperature for a long period may initiate the crosslinking of the polymer. This undesirable premature crosslinking may modify the behavior of the resin, or even prevent it from being used.

It is therefore necessary with the known devices to keep the preform, and the resin that it contains, in a container at a controlled temperature, including during transportation; this poses, of course, practical and cost problems.

The present invention aims to solve these difficulties.

BRIEF SUMMARY OF THE INVENTION

The present invention related to a process and a plant for laying a pipe in a trench. The term "trench" is understood to mean in particular, and mainly, a channel dug out in the ground, having a cross section in the overall shape of a "U" open at the top, intended to be backfilled after the pipe has been deposited therein.

However, the invention may cover other applications, provided that the pipe can be laid freely from the top down.

Thus, for example, the pipe could be laid directly on the ground.

In other applications, it could be deposited on suspension cradles of "U"-shaped cross section supported by posts, at a certain height above the ground.

However, the present invention does not relate to the technical field of the repair of pipes already laid, by internally lining (coating) them, the interior space of which is accessible only axially, starting from one end of the pipe, but not transversely.

The invention relates more particularly to the continuous laying of a cylindrical pipe of great length starting from a flexible tubular preform section, initially folded, especially flattened, capable of being "made round"—that is to say given the shape of a cylinder—by being inflated, owing to the effect of an internal pneumatic pressure (pressurized gas), and then rigidified in situ.

This type of pipe is particularly intended for the transportation of fluids, especially gas or petroleum, over long distances.

The main objective of the invention is to provide a technique for laying a pipe of great length, for example 2000 m, directly, and without connections. The only connection to be made is between the long pipes, in this case every 2 000 m.

The basic concept of this invention is to dissociate the resin from the wall of the preform at the time of its manufacture, the resin being incorporated into the wall only on the site, just-before it is laid in the trench (or on another support).

In the technical field of the internal lining of pipes already laid, it has already been proposed to incorporate a curable resin in the wall of the lining, just before it is inserted (axially) into the pipe. The relevant prior art yto be illustrated by the documents U.S. Pat. No. 4,135,958, U.S. Pat. No. 4,182 262, FR-2 445 220 and FR-2 488 971.

However, in this application, since there is only axial access to the pipe, the tubular lining is installed by turning the wall over on itself, like a sock, the initially internal face becoming the external face and vice versa.

This turning-over operation requires a relatively high axial force, this being higher the larger the wall thickness— In practice, this operation cannot be transposed to wall thicknesses of between approximately 10 and 30 millimeters, as commonly used within the context of the present invention, if it is desired to employ a moderate pressure, using compressed air.

The tubular lining is radially deformable in order to allow it to be turned over on itself and applied against the wall to be repaired.

Finally, the impregnation of the wall with this resin, whether carried out in a discontinuous manner (as in U.S. Pat. No. 4,135,958) or in a continuous manner, with the formation of a movable resin pocket located upstream of the wall turn-over region, is difficult to control and this impregnation is not homogeneous.

The process forming the subject of the present invention is a process for laying a cylindrical pipe in a trench open at the top, starting from a section of flexible tubular preform, which is initially folded, capable of being made round by inflation due to the effect of internal pressure, but not radially expansible due to the effect of this internal pressure, and the wall of which includes a filamentary reinforcement surrounding an inner sealing skin.

The abovementioned objective is achieved, and the drawbacks which have just been mentioned are avoided, by the process according to the invention by the fact that:

on the one hand, this laying process is carried out without the wall of the perform being turned over on itself ("in the manner of a sock");

on the other hand, the process is carried out in the following manner:
a) the section of preform is brought close to the trench;
b) the reinforcement is impregnated in situ with a curable resin;
c) the section of preform is deposited from the top down into the trench;
d) the section of preform is inflated pneumatically, after having closed off the ends thereof, so as to give it a cylindrical shape;
e) the resin is made to cure;
and that operation (b) (impregnation) and operation (c) (deposition) are carried out in a continuous manner.

It should be noted that, because the preform is made round pneumatically, this operation is particularly simple and inexpensive to implement, air being naturally available when required on the site; it is simply necessary to have a compressor generating a relatively low pressure, for example of the order of 1 bar ($10^5$ Pa).

Moreover, according to a number of additional nonlimiting features of this process:
the section of preform is coated with a protective tubular sheath, after its reinforcement has been impregnated with the thermosetting resin, before the preform is deposited in the trench;
the resin impregnation is carried out under reduced pressure (with respect to atmospheric pressure), or even under vacuum;
the section of preform is inflated by compressed air after the ends have been closed off;
a thermosetting resin is used;
the resin is cured by heating, by the Joule effect, by means of electrical resistance elements incorporated into the filamentary reinforcement;
the filamentary reinforcement comprises a braiding of crossed fibers, which is capable of preventing the radial expansion of the wall of the preform when it is made round;
the section of preform is brought onto the site in the stored state, folded or wound;
a section of preform initially coated with a protective tubular sheath is used, the sheath being removed before the reinforcement is impregnated with the curable resin;
the pipe is produced by connecting several sections of preform together end to end.

The subject of the invention is also a plant for laying a cylindrical pipe in a trench, starting from a section of flexible tubular preform which is initially folded, for example flattened, capable of being made round by inflation due to the effect of internal pressure, and the wall of which is provided with a filamentary reinforcement, this laying operation being carried out without turning the wall of the section of preform over on itself.

This plant is noteworthy in that it comprises a mobile assembly capable of moving along the support, and comprising;
a container for storing the folded section of preform;
means for progressively pulling said section out of the container;
a storage tank containing a curable resin (for example a thermally curable resin);
means for impregnating &he filamentary reinforcement with curable resin, this being done continuously and progressively as it is being extracted from the container;
means for depositing, still continuously, and from the top down, the section prefurnished with resin into the trench;
means for blowing compressed air' into the section of preform and for inflating it, so as to give it a cylindrical shape, after it has been deposited in the trench; and
means capable of causing the resin to cure.

Moreover, according to a number of additional nonlimiting features of the plant:
since this plant is intended to be employed for a thermosetting-resin preform, the means serving to make it cure are heating means;
these means are electrical means, capable of heating the resin by the Joule effect, via resistance heating elements incorporated into the reinforcement; and the plant includes a vacuum pump suitable for putting the resin impregnation means under reduced pressure.

BRIEF DESCRIPTION OF THE DRAWINGS

Further features and advantages of the invention will become apparent from the description which will now be given, with reference to the appended drawings in which:

FIG. 1 is a cut-away schematic view, in cross section and in perspective, of a section of perform used in the process according to the invention;

FIGS. 2 and 3 are schematic views, from the front and side respectively, in the plane of section III—III in FIG. 2, of a container for storing the preform;

FIG. 4 is a schematic front view of a plant according to the invention, during an operation of laying a pipe;

FIG. 5 is a side view corresponding to the vertical plane of section V—V in FIG. 4;

FIG. 6 is a schematic top view of part of this same plant, this view showing more particularly the operation of resin impregnation around the preform;

FIGS. 7a, 7b, 7c, 7d and 7e are diagrams illustrating the various steps in the procedure of laying a pipe using the process according to the invention;

FIG. 8 is a cross section of the initial preform; and

FIGS. 9 and 10 illustrate, still in cross section, the laying of the preform pre-impregnated with resin, before and after inflation respectively.

DETAILED DESCRIPTION OF THE INVENTION

The initial preform 1, illustrated in FIG. 1, is folded over on itself, in this case flattened in the manner of a fire hose empty of water.

Its wall is flexible and deformable and comprises, from the inside outward, a thin tubular sealing skin 10, a filamentary reinforcement 2 and a protective sheath 3.

This preform 1, the longitudinal axis of which is denoted by X–X', may be of relatively great length, for example about 1 000 to 2 000 m.

The inner skin 10 is, for example, made of synthetic rubber.

The filamentary reinforcement 2 consists of an assembly of fibers 20, such as glass or carbon fibers for example,' which will give the finished pipe the required mechanical and chemical properties.

The filamentary reinforcement 2 may advantageously consist of a number of concentric tubular structures inserted one into another, and each formed by a braiding of flat filaments or tapes 20, these being distributed in two series 20a, 20b which intersect symmetrically with respect to the axis X–X'.

Each tape is, for example, formed from a plurality of juxtaposed fibers.

A tubular structure of this kind is described in the document U.S. Pat. No. 5,695,008, to which reference may be made as required.

It is important for the radial deformation of the preform, which as will be seen later is carried out pneumatically, to correspond to a well defined diameter.

To do this, assuming a braiding of intersecting fibers, as mentioned above, is used, this result may be achieved using an angle of 108° between the two series of tapes 20a, 20b (i.e. 54° on each side of the longitudinal axis), which angle makes the perform radially inexpansible by application of internal pressure.

Correspondingly, because the wall of the preform is radially inexpansible its length cannot vary due to the effect of the inflation.

The reinforcement 2 contains no resin.

The outer sheath 3 is a temporary sheath, which may be obtained, for example, by the helical winding of a thin strip of plastic. The function of the sheath 3 is to keep the filamentary reinforcement 2 away from dirt and to make it easier to handle the preform, especially when putting it into storage and taking it out of storage.

It will be seen in FIG. 1 that the reinforcement 2 comprises longitudinal yarns 21; these are electrically conducting yarns which, in the example illustrated, are arranged along the longitudinal direction of the preform. They are suitable for heating the wall of the preform by the Joule effect, these yarns 21 being designed to form one or more electrical circuits capable of being connected up to an electric current generator at one of the ends of the preform.

FIGS. 2 and 3 show one possible way of storing the preform 1.

According to this method of storage, a container 4, or basket, of rectangular parallelepipedal shape, the width of which corresponds to the width of the section of preform 1, is used.

The preform is folded over on itself in a zig-zag manner to form layers stacked one on top of another, filling the internal space of the container.

As illustrated in FIG. 4, the container 4 may constitute a compartment of the body of a truck 40, intended to be moved along the trench T to be furnished, for example astride this trench.

The plant, which is shown very schematically in FIGS. 4 to 6, consists of the aforementioned truck 40 to which a trailer 5 is hitched.

The assembly is mounted on wheels capable of straddling the trench T, as may be seen in FIG. 5.

The container 4 is provided with a device 41 for taking out of storage and for delivering the section of preform 1 contained in said container 4.

This device may be of any suitable known type; in FIG. 4, it is shown schematically by a pair of rotating rollers, which linearly ensures continuous and uniform extraction of the section 1 from the container 4.

The section of preform then passes through treatment devices 6, 7, 8 with which the trailer 5 is equipped. They are continuously extracted from the latter in a progressive and uniform manner by a device 81 which may be a roller device similar to the device 41, after which it is deposited in the bottom of the trench T.

It goes without saying that the rate of advance of the mobile assembly 4–5, which is shown symbolically by the arrow F in FIGS. 4 and 6, is synchronized to the rate of extraction of the preform by the means 41, 81 so that the preform is progressively deposited in a uniform manner, continuously, at the bottom of the trench T.

The trailer 5 is equipped with a tank 50 containing the liquid resin intended to be incorporated into the preform 1.

It is, for example, a thermally curable resin, which is a liquid at room temperature; the tank 50 is thermally insulated and its temperature is controlled so that the resin is properly preserved therein.

The device 6 is designed to remove the abovementioned protective sheath 3.

For this purpose, this device comprises a take-up reel 60, which is mounted so as to rotate, on the one hand, about its own axis, parallel to the axis X–X' of the preform, and, on the other hand, about the preform.

Suitable control means (not shown) are provided for impressing these two conjugate rotational movements on the reel 60.

In FIG. 6, the rotation of the take-up reel 60 about itself and the rotation of the reel about the preform are shown symbolically by the arrow i and the arrow j, respectively, these movements ensuring that the protective tape 3 is pulled off and removed by being unwound (and rewound on the reel).

The filamentary reinforcement 2 is thus bared.

Next, the preform enters the treatment device 7.

The function of this device is to impregnate, still continuously, the filamentary reinforcement 2 with resin.

For this purpose, it comprises means 70 for coating the preform with resin taken from the tank 50 via a delivery system comprising one or more suitable pumps 700.

Preferably, the internal space of the treatment device 7 is kept under reduced pressure (with respect to atmospheric pressure) by means of a vacuum pump 701. Suitable seals are provided for this purpose in the passages separating the device 7 from the upstream device 6 and from the downstream device 8.

Various principles may be applied, allowing the filamentary reinforcement furnishing the preform to be coated with resin, this coating possibly being carried out by passage through a bath, or especially by spraying with resin. The reduced pressure around the preform favors its impregnation with the resin, preventing the formation of bubbles.

It should be noted that, vacuum impregnation of a tubular filamentary reinforcement is an operation known per se (see, for example, the document U.S. Pat. No. 3,737,261).

Preferably, when the preform has been coated with resin, it is cooled by making it pass through a cooling device 71, which may also be of any known type.

As an example, it is possible, in this station, to blast jets of cold air against the surface of the preform so as to fix the resin, at least partially, in order for it not to flow inopportunely, something which would run the risk of causing irregularities in the wall thickness.

The function of the treatment device 8 which follows is to cover the preform, that has just been impregnated with resin and cooled, with a protective sheath.

The protective sheath may also consist, like the initial sheath 3, of a tape of flexible film 12, for example made of plastic, which wound as a helix around the preform. Its function is to confine the resin around the preform and prevent it from being soiled by sand or earth from the trench.

For this purpose, the protective film 12 is carried by a reel 80 which may rotate both about its own axis, as shown symbolically by the arrows k, in the direction of unwinding, and about the preform, as shown symbolically by the arrow 1.

The resin-impregnated section of the preform 9, the preform being protected by a protective film, is continuously deposited over its entire length, labeled L, in the bottom of the trench T as a result of the movement of the mobile assembly 4,5 along the latter.

This situation is illustrated in FIG. 7a.

Next, the two ends of the preform 9 are closed off in an airtight manner by means of closure plugs 90, 91, as illustrated in FIG. 7b.

Next, a pneumatic compressor 92 is connected to one of the closure plugs, in this case the plug 90, as illustrated in FIG. 7c.

The preform 9 is inflated with compressed air by means of this compressor 92; the inflation propagates progressively from the plug 90 toward the opposite plug 91 and the preform is made "round", adopting a cylindrical shape.

Of course, the protective film is sufficiently flexible and elastic not to counteract the radial expansion of the preform wall during inflation.

As already mentioned above, the circular cross section thus obtained is well defined, and constant from one end to the other, because of the inexpansible nature of the filamentary reinforcement.

A pressure of the order of 1 bar is sufficient for the preform to be correctly inflated over its entire length L.

The process then continues with the curing of the resin.

In the example illustrated in FIG. 7d, this curing is obtained by electrical means, an electric current generator 93 being connected to the circuit of electrical resistance elements 21 mentioned above with reference to FIG. 1. Thus, the resin impregnating the reinforcement 2 is cured by the Joule effect.

Curing is complete after a few hours of heat treatment.

Once the section of pipe, labeled 9' in FIG. 7d, is perfectly rigid, the end plugs 90, 91 can be removed.

The process then continues in the same way with the next section of pipe.

It is easy to connect the various sections end to end, for example by wrapping around the adjacent end regions of two adjacent sections, layers of fabric impregnated with an appropriate curable resin in order to form a connecting sleeve, which is impervious after the resin has cured.

FIG. 7e illustrates the end-to-end joint between two sections of pipe 9a, 9b by means of such a sleeve 900.

FIGS. 8, 9 and 10 show, respectively, the resin-free 3nd flattened initial preform 1, the resin-impregnated preform 9, again flattened, deposited at the bottom of the trench on a bed of sand S, and the finished pipe 9', made round and rigidified, and covered with backfill R. By way of indication, the pipe 9' has a diameter of between 300 mm and 600 mm approximately and a wall thickness of between 10 mm and 30 mm approximately.

It goes without saying that a catalytic-type resin could be used, this not requiring a heat source in order to be cured.

In this scenario, the mobile plant 5 may be equipped with two tanks, one containing the resin and the other containing the catalyst, these two products being mixed together at the time of impregnating the preform. Instead of being stored in the flattened state, the section of preform may be wound on a take-up drum (pay-out). The cross section of the initial preform is not necessarily flat. It may be folded in the shape of a U or "snail-like", for example.

The volume of resin needed is between approximately 5 and 20 liters per linear meter of pipe.

The mobile assembly 4–5 does not necessarily straddle the trench which is to receive the pipe.

The plant may be designed so as to hug the trench along one of its sides, a system for shifting the perform laterally being provided in order to guide it and deposit it in the trench progressively as the plant moves forward.

As the operation proceeds, the plant is restocked with resin and with sections of preform.

The resin may be brought onto the site in thermally insulated drums at a controlled temperature.

The sections of preform may be brought onto the site in baskets 4 or on movable reels, which can easily be fitted onto the truck 40.

The invention is particularly suitable for laying oil pipes, gas pipes and similar pipes intended for the transportation of a fluid over long distances.

This pipe is not necessarily laid in a trench, the support possibly simply consisting of the ground, or it may consist of a set of suspension cradles supporting the pipe at regular intervals at a certain height above the ground. Of course, the plant is designed in such a way that it is tailored to the support in question.

What is claimed is:

1. A process for laying a cylindrical pipe in a trench (T) open at the top, starting from a section of flattened flexible tubular preform (1, 9), capable of being made round but not radially expansible by inflation due to the effect of internal pressure, wherein the wall of the preform (1, 9) includes a filamentary reinforcement (2) surrounding an inner sealing skin (10), characterized in that, on the one hand, this laying process is carried out without the wall of the preform (1, 9) being turned over on itself, and, on the other hand, the process is carried out in the following manner:
    a) the section of preform (1) is brought close to the trench (T);
    b) the reinforcement (2) is impregnated in situ with a curable resin (11);
    c) the section of resin-impregnated preform (9) still in the flattened state is deposited from the top down into the trench (T);
    d) the section of preform (9) is inflated pneumatically, after having closed off the ends thereof, so as to give it a cylindrical shape;
    e) the resin (11) is made to curie by heating by electrical resistance elements (21) incorporated into the reinforcement (2);
        wherein operations (b) and (c) are carried out continuously.

2. The process as claimed in claim 1, characterized in that the filamentary reinforcement (2) comprises a braiding of crossed fibers (21a, 21b), which is capable of preventing the radial expansion of the wall of the perform (9) when it is made round.

3. The process as claimed in claim 1, characterized in that the section of preform (1) is brought onto the site in the stored state, folded or wound.

4. The process as claimed in claim 1, characterized in that a section of preform (1) initially coated with a protective tubular sheath (3) is used, the sheath being removed before the reinforcement (2) is impregnated with the curable resin (11).

5. The process as claimed in claim 1, characterized in that the pipe is produced by connecting several sections of preform (9a, 9b) together end to end.

6. The process as claimed in claim 1, characterized in that the section of preform (9) is coated with a protective tubular sheath (12) after its reinforcement (2) has been impregnated with the curable resin (11) and before the preform (9) is deposited in the trench (T).

7. The process as claimed in claim 1, characterized in that the impregnation of the resin 11 is carried out under reduced pressure.

8. The process as claimed in one of claims 1 to 3, characterized in that a thermosetting resin (11) is used.

9. The process as claimed in claim 8, characterized in that the resin (11) is cured by heating by the Joule effect.

10. A plant used to lay a cylindrical pipe in a trench (T), starting from a section of flattened flexible tubular preform (1, 9), capable of being made round but not radially expansible by inflation due to the effect of internal pressure, wherein the wall of the preform (1, 9) is provided with a filamentary reinforcement (2) surrounding an inner sealing skin (10), this laying operation being carried out by the plant without turning the wall of the section of preform (1, 9) over on itself, characterized in that the plant comprises a mobile assembly (4–5) capable of moving along a support (S) adjacent the trench (T), and comprising:
    a container (4) for storing the flattened section of preform (1);
    means (41) for progressively pulling said section (1) out of the container (4);
    a storage tank (50) containing a curable resin (11);
    means (70) for continuously and progressively impregnating the filamentary reinforcement (2) with the curable resin (11) as the section (1) is extracted from the container (4);
    means (8, 81) for continuously depositing, from the top down, the section of resin-impregnated perform (9) into the trench (T) while still in the flattened state;
    means (90–91, 92) for blowing compressed air into the section of preform (9) and for inflating the section of preform (9), so as to give it a cylindrical shape, after it has been deposited in the trench (T); and
    means (93) for electrically heat curing the resin (11) via resistance heating elements (21) incorporated into the reinforcement (2).

11. The plant as claimed in claim 10, characterized in that said means (93) are capable of heating the resin by the Joule effect.

12. The plant as claimed in one of claim 10 or 11, characterized in that the plant includes a vacuum pump (701) suitable for putting the resin impregnation means (70) under reduced pressure.

* * * * *